UNITED STATES PATENT OFFICE.

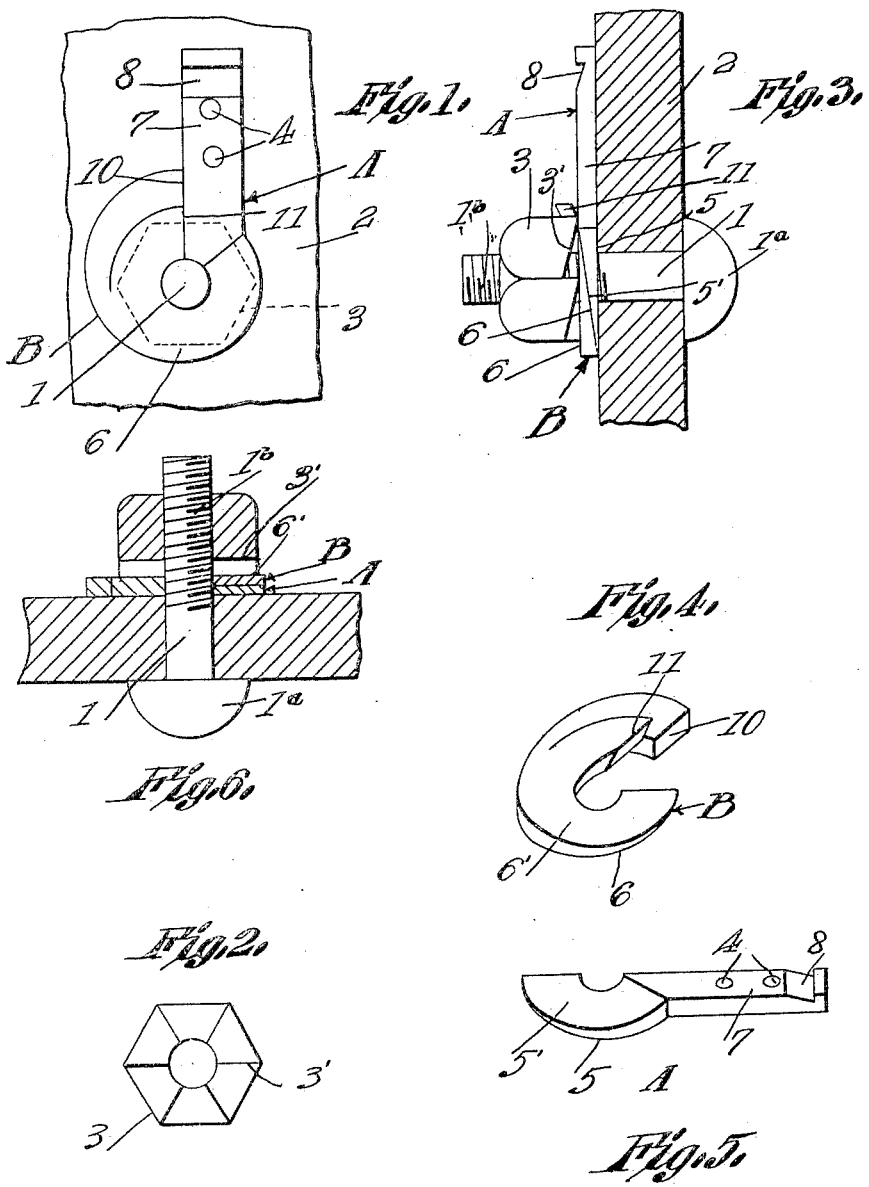

RICHARD H. OWEN, OF LEXINGTON, NORTH CAROLINA.

NUT AND WASHER.

1,258,440.   Specification of Letters Patent.   Patented Mar. 5, 1918.

Application filed April 16, 1917.   Serial No. 162,412.

*To all whom it may concern:*

Be it known that I, RICHARD H. OWEN, a citizen of the United States, residing at Lexington, in the county of Davidson and State of North Carolina, have invented a new and useful Nut and Washer, of which the following is a specification.

This invention relates to nut locks, and has for its object to provide means whereby accidental severance of the nut from the bolt will be reduced to a minimum.

The invention also has for its object to employ means for utilizing the retrograde pressure of the nut against its locking means to tighten the bolt on which the nut is mounted.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings:

Figure 1 is a front elevation of the invention.

Fig. 2 is a bottom view of the type of nut used;

Fig. 3 is an end elevation of the invention as it appears when assembled;

Figs. 4 and 5 are detail perspective views of the washer;

Fig. 6 is a cross section taken on the line 3—3 of Fig. 1.

Referring more specifically to the drawings, the numeral 1 designates any common form of bolt provided with a head 1ª and a thread portion 1ᵇ passing through an opening in a fish-plate or any other body portion 2 intended to receive a bolt.

The bolt 1 has a nut 3 provided with ratchet teeth 3'. The washer is made of any suitable material, preferably metal; and is composed of two segments A and B, adapted to be interposed on the bolt 1, between the base 2 and nut 3. The segment A has a flat base 5 throughout its length, and an outer inclined or cam surface 5'. Formed on the thick end of this segment A and extending outwardly therefrom is a shank 7. This shank 7 may be provided with openings adapted to receive rivets 4 so that the shank may be held in a rigid position with the base 2. The shank 7 is also provided with a notched portion 8, the purpose of which will be hereinafter explained.

The segment B is formed with an inclined or cam surface 6 and a flat surface 6'. The cam surface of the segment B is adapted to engage with the cam surface of the segment A, the two cam faces being oppositely pitched. The thick end of the segment B is split to form a tongue 10 and pawl 11. The pawl is bent outwardly from the surface 6' and adapted to engage with the teeth 3' of the nut 3.

In use, the bolt 1 is placed through a base 2. The segment A is placed in its position on the bolt and the shank 7 is then secured to base 2. The segment B is then placed on the bolt 1, the cam surface of the said segment engaging the cam surface of the segment A. The nut 3 is then turned on the bolt to the position shown in Fig. 3. The pawl 11 springs into engagement with a tooth on the nut 3 and prevents retrograde rotation of said nut. If, however, the head of the bolt is not in a snug position with the base 2, upon reverse movement of the nut the segment A will travel in the same direction as the nut upon the segment B, thereby causing the head of the bolt to come in tighter engagement with the base 2.

When it is desired to remove the nut from the bolt, a chisel or other implement is placed in the notched portion 8 and driven longitudinally of the shank 7 until the rivets 4 are disengaged from their position in the base 2. The segment B may then be easily removed from its position and the segment A likewise removed.

Having thus described the invention, what is claimed as new is:

A nut lock comprising a bolt, a nut adapted to be threaded on the bolt, teeth on the inner face of the nut, a cam faced member formed with a radial shank adapted to embrace the bolt, said shank provided with a transverse notch, a split washer, formed with a cam face complemental to the cam face member, adapted to encircle the bolt, and a pawl on the washer and positioned to engage the teeth of the nut.

In testimony that I claim the foregoing as my own, I have hereto affixed my signature in the presence of two witnesses.

RICHARD H. OWEN.

Witnesses:
H. H. KOONTS,
JNO. H. MOYER.